US008154596B2

(12) United States Patent
Ishii (10) Patent No.: US 8,154,596 B2
(45) Date of Patent: Apr. 10, 2012

(54) REDUCTION IN LOAD OF IMAGE TRANSMISSION

(75) Inventor: Eisaku Ishii, Tokyo (JP)

(73) Assignee: NEC Viewtechnology, Ltd, Tokyo (JP)

(*) Notice: Subject to any disclaimer, the term of this patent is extended or adjusted under 35 U.S.C. 154(b) by 1345 days.

(21) Appl. No.: 11/376,326

(22) Filed: Mar. 16, 2006

(65) Prior Publication Data

US 2006/0209340 A1 Sep. 21, 2006

(30) Foreign Application Priority Data

Mar. 17, 2005 (JP) ................................ 2005-077173

(51) Int. Cl.
*H04N 7/18* (2006.01)
*H04N 5/77* (2006.01)

(52) U.S. Cl. .................... 348/143; 348/154; 386/226

(58) Field of Classification Search .................. 348/1.15, 348/14.12, 211.1, 143, 154–155; 358/1.15; 382/103; 386/226

See application file for complete search history.

(56) References Cited

U.S. PATENT DOCUMENTS 6,839,452 B1 * 1/2005 Yang et al. .................... 382/103
2004/0158864 A1 * 8/2004 Kakemura ....................... 725/80

FOREIGN PATENT DOCUMENTS

JP 2004-007089 1/2004
JP 2004007089 A * 1/2004
JP 2004-242152 8/2004

OTHER PUBLICATIONS

Japanese Office Action dated Mar. 26, 2008 with Partial English translation.

* cited by examiner

*Primary Examiner* — Lin Ye
*Assistant Examiner* — Mekonnen Dagnew
(74) *Attorney, Agent, or Firm* — McGinn Intellectual Property Group, PLLC (57) ABSTRACT

An image transmitting method is disclosed for reducing the load on a CPU of an image transmission apparatus. An image change monitoring unit provided in the image transmission apparatus monitors the latest image used to generate image data transmitted to an image reception apparatus via a network, and a subsequent image to determine whether or not the latest image has changed. An image capture unit captures the image after the image has changed to acquire the image when the image change monitoring unit determines that the latest image has changed.

19 Claims, 11 Drawing Sheets

REDUCTION IN LOAD OF IMAGE TRANSMISSION

BACKGROUND OF THE INVENTION

1. Field of the Invention

The present invention relates to an image transmission apparatus and an image transmitting method for transmitting image data via a network using wired or wireless technologies.

2. Description of the Related Art

A conventional image transmission apparatus periodically captures a displayed image, and transmits the captured image data from the displayed image to an image reception apparatus. However, even when no changes or merely local changes occur in the image, the entire image, including unchanged portions, is processed, thus causing wasteful processing. To solve this problem, a method has been contemplated to extract changing pixels using coordinate information in the image and the like and process only those extracted changed pixels.

However, the above-mentioned processing cannot be performed if there is no means for finding locally changing areas in the image using coordinate information and the like. Therefore, JP-A-2004-242152 discloses an alternative method which periodically captures an entire image to compare current image data captured from the image with the last transmitted image data, and transmits the image data to an image reception apparatus only when differences are found therebetween.

However, the method disclosed in the above patent document periodically captures the entirety of a current image even when there is no change from the last transmitted image. Generally, the time required for capturing an image written in a video memory is significantly longer than the time required for writing an image into the video image. Therefore, it is not an appropriate method to capture an entire image for purposes of detecting changes in the image. Also, the capturing an entire image even when there is no change in the image puts a large wasteful load on the CPU (Central Processing Unit), which controls the image transmission apparatus. This causes a problem of preventing the CPU from operating other application software.

SUMMARY OF THE INVENTION

It is an object of the present invention to provide an image transmission apparatus and an image transmitting method which are capable of reducing the load on the CPU of the image transmission apparatus in order to improve the operating speed of application software.

In the present invention, the latest image used to generate transmitted image data and a subsequent image are monitored in an image transmission apparatus to determine whether or not the latest image has changed. When it is determined that the latest image has changed, the image after the latest, changed image, is captured. Then, image data generated from the captured image is transmitted to an image reception apparatus via a network.

In this way, an image is captured only when the latest image has changed, which eliminates the need for capturing the image at all times, thus making it possible to reduce the load on the CPU of the image transmission apparatus. Also, while the images remain unchanged, other processing can be performed, other than image capturing, such as processing of application software and the like.

The above and other objects, features, and advantages of the present invention will become apparent from the following description with reference to the accompanying drawings which illustrate an example of the present invention.

DETAILED DESCRIPTION OF THE PREFERRED EMBODIMENTS

Figure 1:
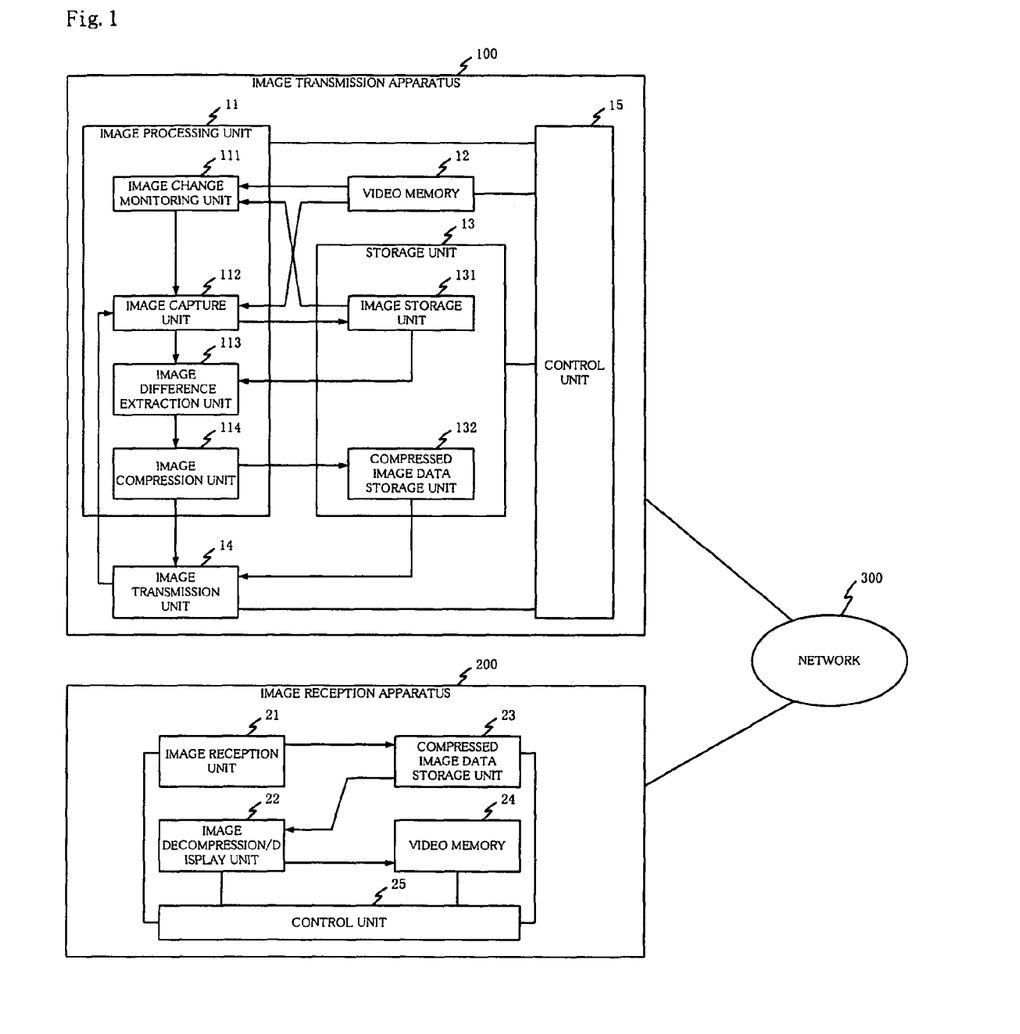
FIG. 1 is a diagram illustrating one embodiment of an image transmission system using an image transmission apparatus of the present invention.

Referring to FIG. 1, there is illustrated an image transmission system which comprises image transmission apparatus 100, and image reception apparatus 200 connected to image transmission apparatus 100 via network 300. Image transmission apparatus 100 transmits image data. Image reception apparatus 200 receives image data transmitted from image transmission apparatus 100 via network 300.

Further, image transmission apparatus 100 includes video memory 12, storage unit 13, image processing unit 11, image transmission unit 14, and control unit 15 for controlling these components. Video memory 12 stores images. Storage unit 13 stores image data transmitted to image reception apparatus 200 via network 300 and image used to generate the image data. Image processing unit 11 monitors the latest image used to generate image data transmitted to image reception apparatus 200 via network 300, and a subsequent image stored in video memory 12, and compares them to generate image data. Image transmission unit 14 transmits image data generated by image processing unit 11 to network 300.

Further, image processing unit 11 includes image change monitoring unit 111, image capture unit 112, image difference extraction unit 113, and image compression unit 114. Image change monitoring unit 111 monitors the latest image used to generate image data transmitted to image reception apparatus 200 via network 300, and a subsequent image stored in video memory 12 to compare them at fixed intervals. Image capture unit 112 captures an image stored in video memory 12. Image difference extraction unit 113 compares the image used to generate image data transmitted to image reception apparatus 200 via network 300, stored in storage unit 13, with image captured by image capture unit 112 to extract differences therebetween. Image compression unit 114 compresses image in accordance with difference data extracted by image difference extraction unit 113 to generate compressed image data which is image data for transmission.

Storage unit 13 includes image storage unit 131 and compressed image data storage unit 132. Image storage unit 131 stores image used to generate image data transmitted to image reception apparatus 200 via network 300, and image captured by image capture unit 112. Compressed image storage unit 132 stores compressed image data compressed by image compression unit 114.

Image reception apparatus 200 in turn includes image reception unit 21, image decompression/display unit 22, compressed image data storage unit 23, video memory 24, and control unit 25 for controlling these components. Image reception unit 21 receives image data transmitted from image transmission apparatus 100 via network 300. Compressed image data storage unit 23 stores the image data received by image reception unit 21. Image decompression/display unit 22 retrieves image data stored in compressed image data storage unit 23 and decompresses the image data into a data format available for display on the screen. Video memory 24 stores image decompressed by image decompression/display unit 22.

Next, an image transmitting method in the image transmission system will be described below with reference to FIG. 2.

First, at step 401, image change monitoring unit 111 is activated, for example, at intervals of 100 ms or the like. Then, at step 402, it is determined in image change monitoring unit 111 whether or not image capture unit 112 is waiting for an image capture request.

If it is determined in image change monitoring unit 111 that image capture unit 112 is not waiting for an image capture request, the flow returns to the processing at step 401.

On the other hand, if it is determined that image capture unit 112 is waiting for an image capture request, image change monitoring unit 111 compares the latest image used to generate image data transmitted to image reception apparatus 200 via network 300 with a subsequent image stored in video memory 12 to examine whether or not respective portions of image match in the two images at step 403.

If it is determined that the compared portions of image do not match, i.e., if any different site is detected, the latest image is assumed to have changed, thus terminating the comparison at step 403. Then, at step 404, image change monitoring unit 111 notifies image capture unit 112 of an image capture request.

On the other hand, if it is determined that the compared portions of image match, it is determined at step 405 whether or not the comparison has been made for all portions of image which should be compared in image change monitoring unit 111. If it is determined that the comparison has not been completed, i.e., if portions of image subjected to the comparison still remain in the images, the flow returns to processing at step 403, where next portions of image are compared.

The foregoing processing constitutes preprocessing before image capture processing is performed.

Referring next to FIGS. 3 to 6, a description will be given below of portions of image which are set in image change monitoring unit 111 and are subjected to the comparison.

Figure 2:
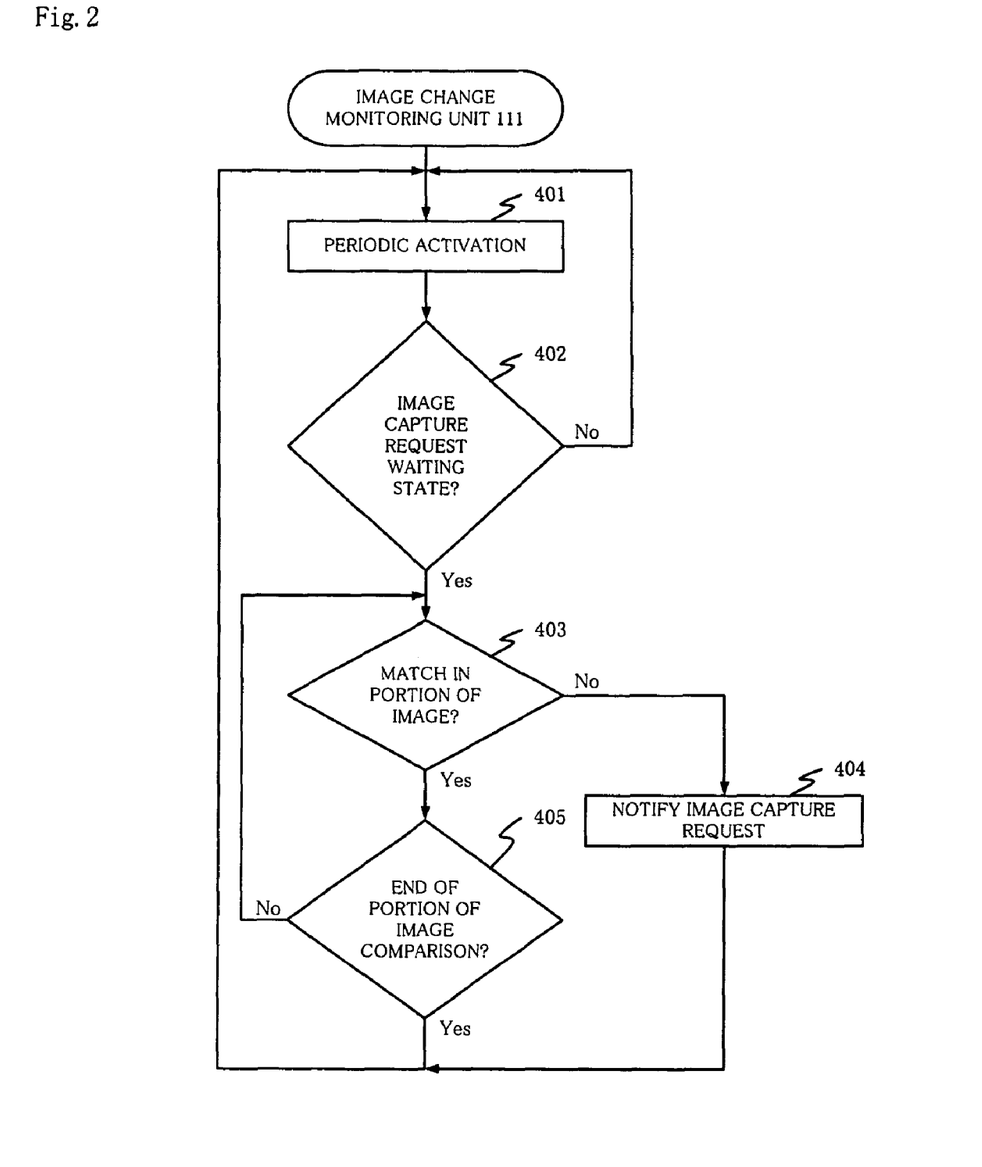
FIG. 2 is a flow chart for describing processing of an image change monitoring unit shown in FIG. 1 within an image transmitting method in the image transmission system illustrated in FIG. 1.
Figure 3:
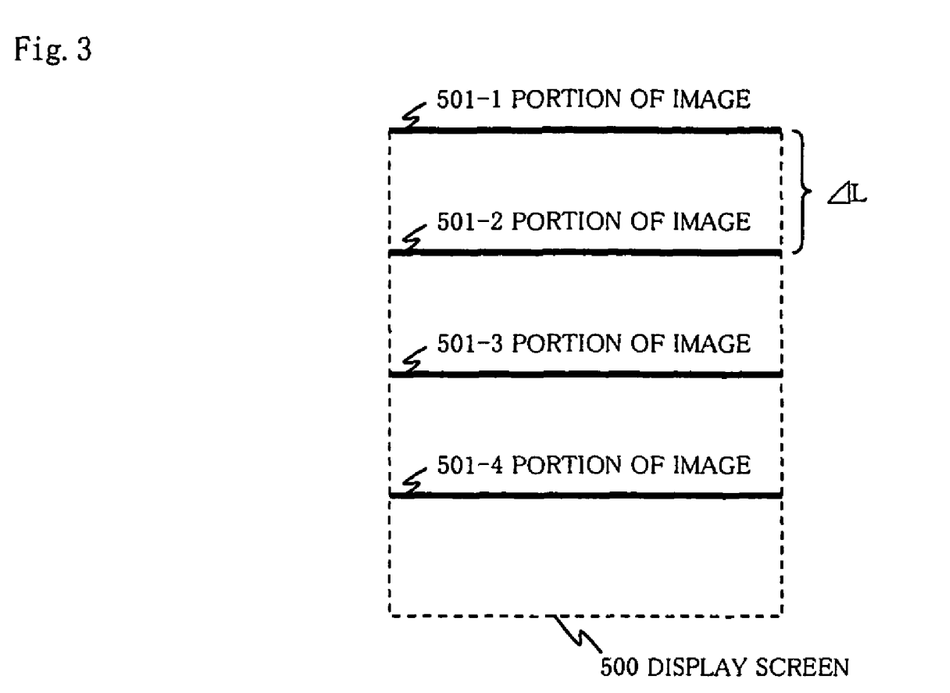
FIG. 3 is a diagram illustrating exemplary portions of image which are compared at the first periodic activation of the image change monitoring unit shown in FIG. 1.

As illustrated in FIG. 3, one portion of image is defined as one line (the width of display screen 500 multiplied by the height of one pixel) which forms part of display screen 500, and portions of image 501-1 to 501-4 (solid lines shown in FIG. 3), which are compared at the first periodic activation, are determined by removing an area of $\varDelta L$ between the respective lines from display screen 500. Here, FIG. 2 is additionally referred to for description. At step 403, first portion of image 501-1 in the latest image is compared with that in the subsequent image. If it is determined that compared portion of image 501-1 match in the two images, it is determined at next step 405 whether or not the comparison has been made for all the portions of image subjected to the comparison. Then, the flow returns to processing at step 403 for next portion of image 501-2 because portions of image 501-2-501-4 have not been compared in the example illustrated in FIG. 3. The same processing is repeated from portion of image 501-2 to portion of image 501-4, and if unmatched sites are detected, the comparison is terminated at that time. On the other hand, if it is determined that all portions of image 501-1 to 501-4 match in the two images, the comparison is then made at the next periodic activation.

Figure 4:
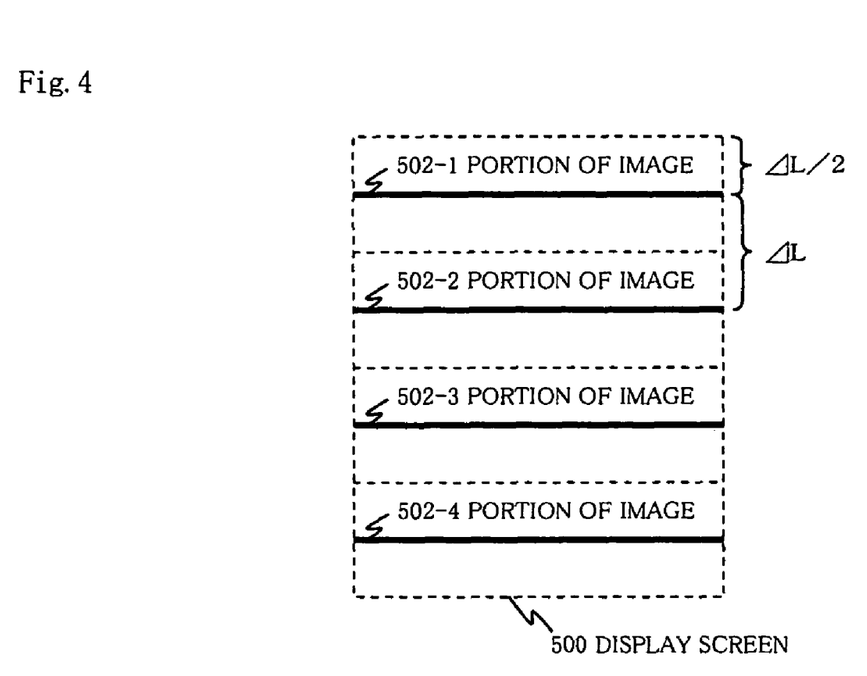
FIG. 4 is a diagram illustrating exemplary portions of image which are compared at the second periodic activation of the image change monitoring unit shown in FIG. 1.

As illustrated in FIG. 4, in the second period, portions of image 502-1 to 502-4 are set at positions (indicated by solid lines in FIG. 4) shifted downward by $\varDelta L/2$ from portions of image 501-1 to 501-4 shown in FIG. 3, respectively. The comparison similar to that triggered by the first periodic activation is repeated from portion of image 502-1 to portion of image 502-4, and if unmatched sites are detected, the comparison is terminated at that time. On the other hand, if it is determined that all portions of image 502-1 to 502-4 match, the comparison is made at the next periodic activation.

Figure 5:
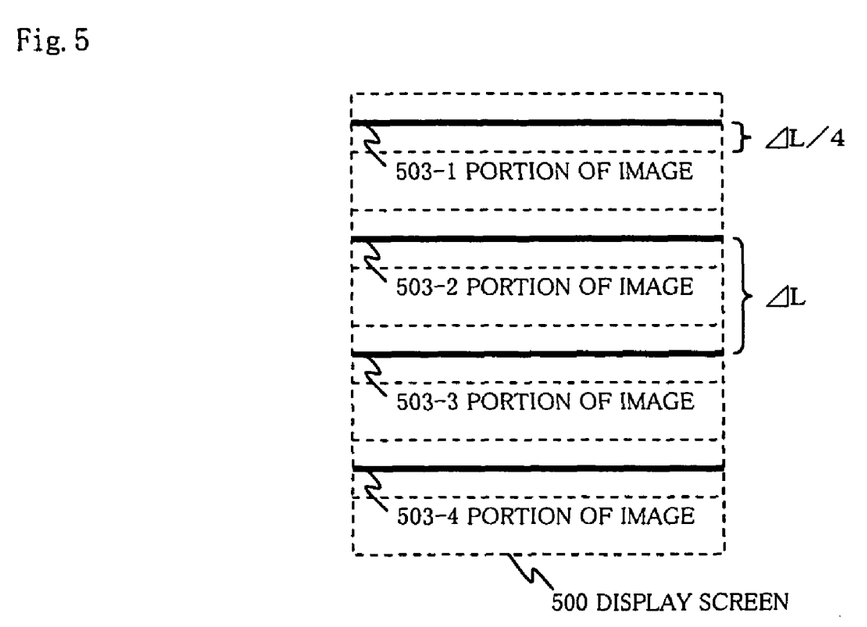
FIG. 5 is a diagram illustrating exemplary portions of image which are compared at the third periodic activation of the image change monitoring unit shown in FIG. 1.

As illustrated in FIG. 5, in the third period, portions of image 503-1 to 503-4 are set at positions (indicated by solid lines in FIG. 5) shifted upward by $\varDelta L/4$ from portions of image 502-1 to 502-4 shown in FIG. 4. The comparison similar to those triggered by the first and second periodic activations is repeated from portion of image 503-1 to portion of image 503-4, and if unmatched sites are detected, the comparison is terminated at that time. On the other hand, if it is determined that all portions of image 503-1 to 503-4 match, the comparison is made at the next periodic activation.

Figure 6:
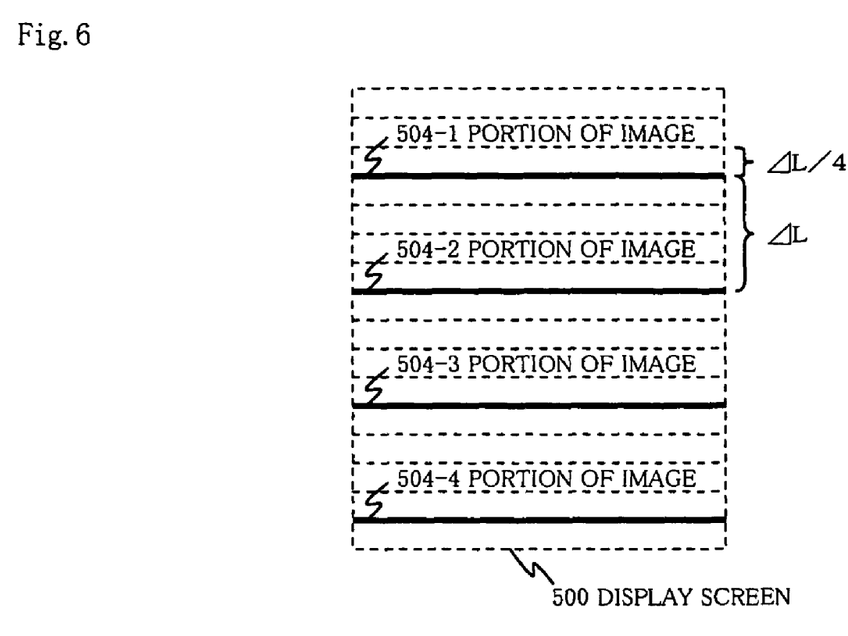
FIG. 6 is a diagram illustrating exemplary portions of image which are compared at the fourth periodic activation of the image change monitoring unit shown in FIG. 1.

As illustrated in FIG. 6, in the fourth period, portions of image 504-1 to 504-4 are set at positions (indicated by solid lines in FIG. 6) shifted downward by $\varDelta L/4$ from portions of image 502-1 to 502-4 shown in FIG. 4. The comparison similar to those triggered by the first, second, and third periodic activations is repeated from portion of image 504-1 to portion of image 504-4, and if unmatched sites are detected, the comparison is terminated at that time. On the other hand, if it is determined that all portions of image 504-1 to 504-4 match, the comparison is made at the next periodic activation.

In this way, the foregoing processing is repeated $\varDelta L$ times until unmatched sites are detected in the portions of image.

When the comparison is terminated due to a detection of unmatched sites, portions of image subjected to the next comparison are returned to portions of image 501-1 to 501-4 shown in FIG. 3 for initializing the comparison in image change monitoring unit 111 at the next time.

Here, taking advantage of the fact that fast accesses can be generally made to areas having a continuous memory address, the portions of image are set in units of lines in the image for the comparison.

Figure 7:
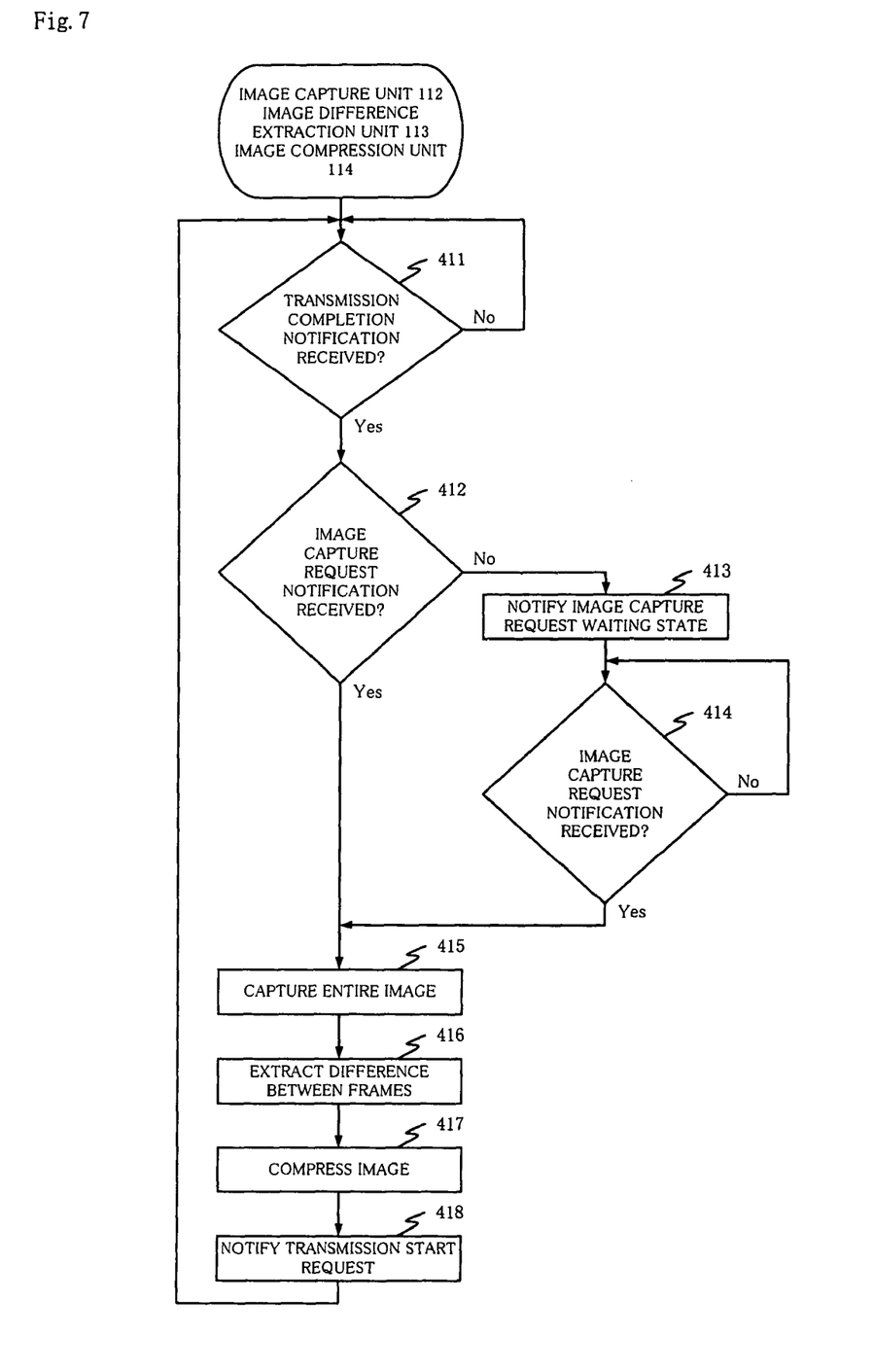
FIG. 7 is a flow chart for describing processing of an image capture unit, an image difference extraction unit, and an image compression unit shown in FIG. 1 within the image transmitting method in the image transmission system illustrated in FIG. 1.

Referring next to FIG. 7, a description will be given below of the processing of image capture unit 112, image difference extraction unit 133, and image compression unit 114 shown in FIG. 1 within the image transmitting method in the image transmission system illustrated in FIG. 1.

First, at step 411, it is determined whether or not image capture unit 112 has been notified of completion of transmission from image transmission unit 14. If it is determined that the completion of transmission has been notified, it is determined at step 412 whether or not image capture unit 112 has been notified of an image capture request from image change monitoring unit 111. It should be noted that in the first processing after power has been turned on, the processing at step 412 is performed on the assumption that completion of transmission has been notified from image transmission unit 14.

If it is determined that no image capture request has been notified from image change monitoring unit 111, image capture unit 112 notifies image change monitoring unit 111 of an image capture request waiting state at step 413. This notification serves as a criterion for image change monitoring unit 111 to determine at step 402, described in FIG. 2, whether or not image capture unit 112 is waiting for an image capture request.

Subsequently, at step 414, it is determined whether image capture unit 112 is notified of an image capture request from image change monitoring unit 111, until image change monitoring unit 111 notifies image capture unit 112 of an image capture request.

If it is determined at step 412 or step 414 that image capture unit 112 is notified of an image capture request from image change monitoring unit 111, image capture unit 112 captures the entire image stored in video memory 12 at step 415. Then, the image captured from amongst all images by image capture unit 112 is written into image storage unit 131 as a newly captured image.

Subsequently, the image captured from amongst all images is delivered to image difference extraction unit 113. Then, image difference extraction unit 113 compares the image supplied thereto, which is image after a change, with the latest image stored in image storage unit 131 which is image before the change. As a result of the comparison, image difference extraction unit 113 extracts difference data associated with changing pixels, and supplies the difference data to image compression unit 114.

Then, at step 417, image compression unit 114 compresses the image data based on the difference data supplied thereto. Next, image compression unit 114 writes the compressed image into compressed image data storage unit 132 as image data generated from the image. Simultaneously, at step 418, image compression unit 114 notifies image transmission unit 14 of an image data transmission start request.

Figure 8:
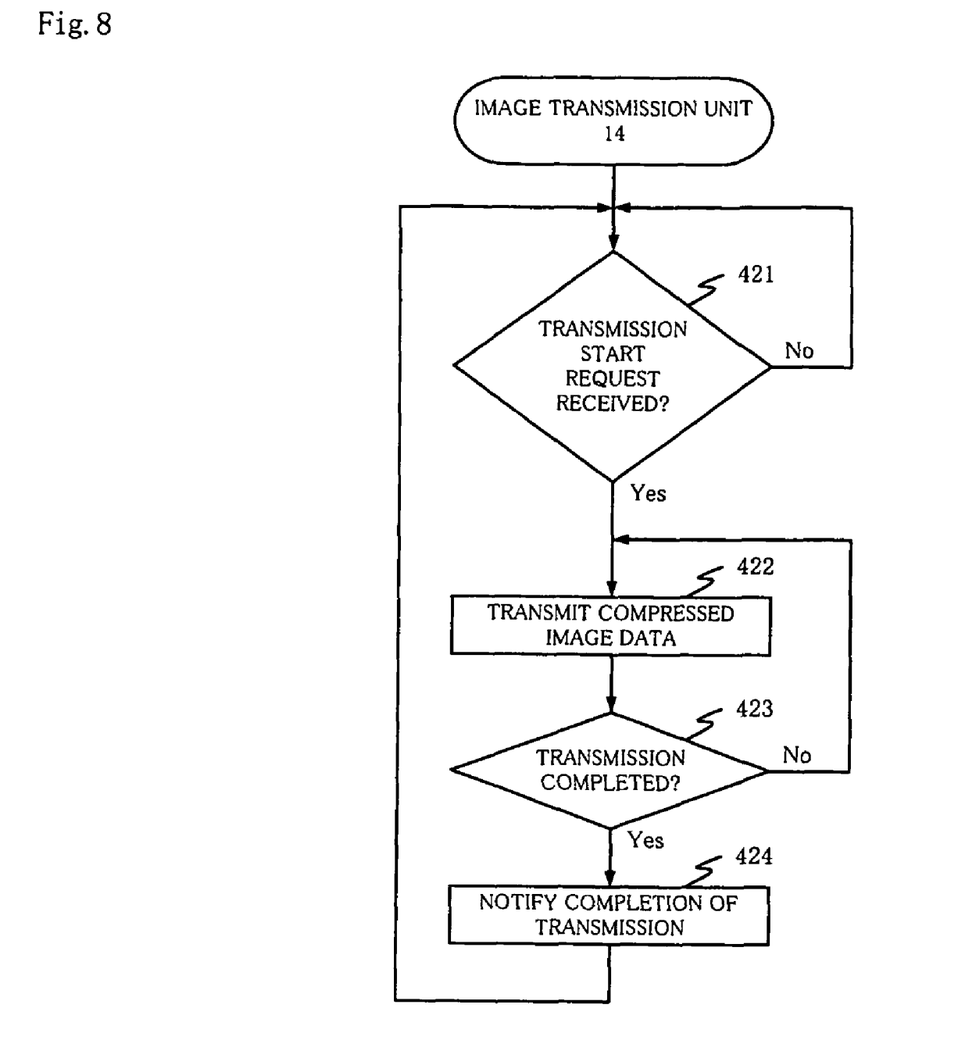
FIG. 8 is a flow chart for describing processing of an image transmission unit shown in FIG. 1 within the image transmitting method in the image transmission system illustrated in FIG. 1.

Referring next to FIG. 8, a description will be given below of the processing by image transmission unit 14 shown in FIG. 1 within the image transmitting method in the image transmission system illustrated in FIG. 1.

First, at step 421, it is determined whether or not image transmission unit 14 has been notified of a transmission start request from image compression unit 114. If it is determined that a transmission start request has been notified from image compression unit 114, image transmission unit 14 retrieves image data to be transmitted from compressed image data storage unit 132 for transmission to network 300 at step 422. Further, at step 423, it is determined in image transmission unit 14 whether or not image data to be transmitted remains in compressed image data storage unit 132. If it is determined that all image data to be transmitted has been transmitted, image transmission unit 14 notifies completion of transmission to image capture unit 112 at step 424. This notification serves as a criterion for image capture unit 112 to determine at step 411, described in FIG. 7, whether or not it has been notified of completion of transmission from image transmission unit 14. In other words, unless image capture unit 112 is notified of completion of transmission from image transmission unit 14, image capture unit 112 is prevented from performing the processing at step 411 onward, as described in FIG. 7. This also causes image capture unit 112 to fail to notify image change monitoring unit 111 that it is waiting for an image capture request, so that image change monitoring unit 111 is also prevented from performing processing at step 402 onward, as described in FIG. 2. Consequently, while image data is being transmitted from image transmission unit 14, neither does image change monitoring unit 111 perform image monitoring processing, nor does image capture unit 112 perform image capture processing.

Accordingly, since the next processing is not performed until the image data has been completely transmitted, wasteful processing can be avoided which reduces a wasteful load on control unit 15 even when network 300 is congested, when only a narrow band is available, and the like.

It should be noted that the respective processing described in FIGS. 2, 7, 8 is performed in parallel with one another.

Next, a description will be given below of processing which is involved in reception of data transmitted from image transmission apparatus 100 at image reception apparatus 200 via network 300.

As image data is transmitted from image transmission apparatus 100 to image reception apparatus 200 via network 300, the image data is received by image reception unit 21. The received image data is stored in compressed image storage unit 23 by image reception unit 21.

Then, image decompression/display unit 22 retrieves the image data stored in compressed image data storage unit 23. The retrieved image data is decompressed into a data format available for display, written into video memory 24, and displayed on the screen.

Next, the load on processing for image capture in control unit 15 shown in FIG. 1 will be described below with reference to FIGS. 9 and 10 in comparison with conventional processing.

Figure 9:
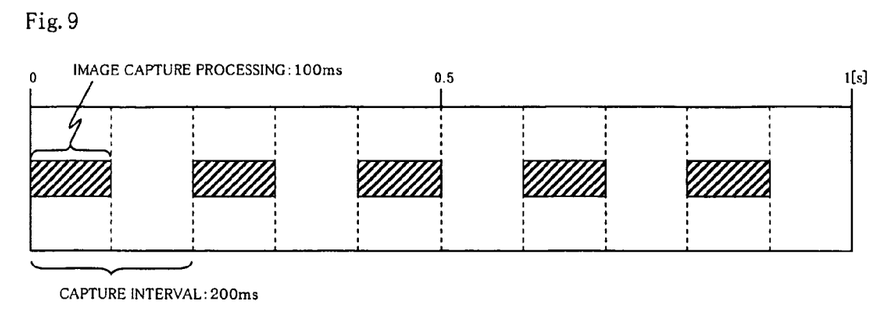
FIG. 9 is a diagram showing the load which image capture processing occupies for one second in a control unit when conventional image capture processing is performed in the image transmission system illustrated in FIG. 1.

As illustrated in FIG. 9, assume that an image capture interval is 200 ms, and the time required for capturing an entire image is 100 ms. Accordingly, in conventional image capture processing, the image capture processing is performed five times per second irrespective of whether the image has changed or not. Therefore, the processing time required by control unit 15 for the image capture processing is calculated by multiplying 100 ms by 5 (times) (=500 ms), so that the image capture processing occupies 50% of all processing time available to control unit 15.

Figure 10:
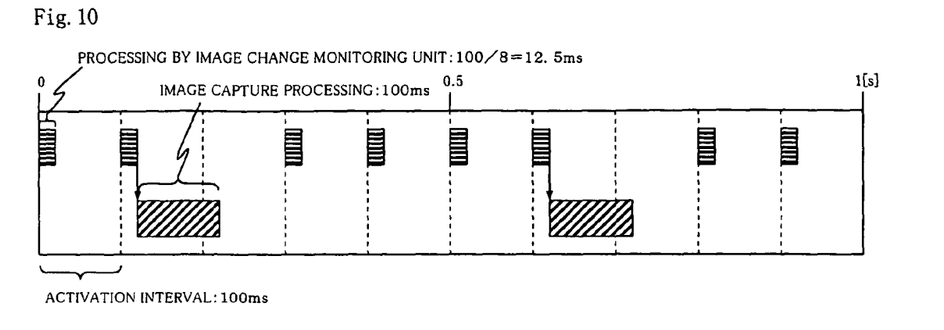
FIG. 10 is a diagram showing the load which image capture processing occupies for one second in the control unit when the image capture preprocessing is performed according to the present invention in the image transmission system illustrated in FIG. 1.

On the other hand, as shown in FIG. 10, assume that image change monitoring unit 111 shown in FIG. 1 is activated at intervals of 100 ms, and that removed spacing $\Delta L$ includes eight lines. Then, video memory 12 is accessed by image change monitoring unit 111 for a duration calculated by dividing 100 ms by eight (=12.5 ms). In the example illustrated in FIG. 10, changes in the image are detected twice per second, so that image capture unit 112 captures the image twice.

Also, while image capture unit 112 is capturing the image, image change monitoring unit 111 does not access video memory 12. Therefore, the processing time of control unit 15 associated with image change monitoring unit 111 and image capture unit 112 is calculated by:

12.5 ms×(10−2)times+100 ms×2 times=300 ms so that the percentage of processing occupied by image change monitoring unit 111 and image capture unit 112 is reduced to 30%.

Also, when change has not been detected in the image, the processing time of control unit 15 associated with image change monitoring unit 111 is calculated by:

12.5 ms×10 times=125 ms so that the percentage of processing occupied by image change monitoring unit 111 is reduced to 12.5%.

It should be noted that in the foregoing calculation, the time required by image change monitoring unit 111 to compare the image stored in video memory 12 with the latest image stored in storage unit 13 is omitted because the time required for the comparison presents a value sufficiently smaller than the time required by image capture unit 112 to retrieve image from video memory 12 (capture time).

Figure 11:
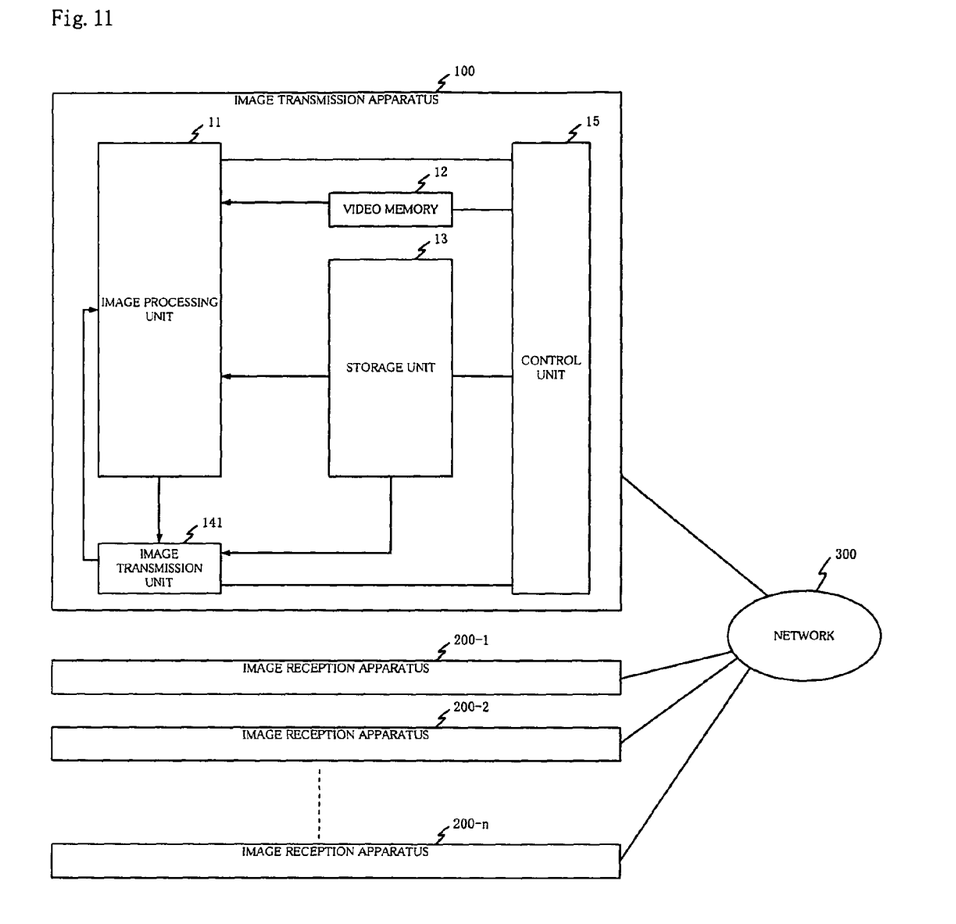
FIG. 11 is a diagram illustrating one embodiment of the image transmission system illustrated in FIG. 1, where a plurality of image reception apparatus are connected to the image transmission apparatus via a network.

Another embodiment contemplated for the present invention may include a plurality of image reception apparatus 200 connected to image transmission apparatus 100 via network 300.

Referring to FIG. 11, there is illustrated an image transmission system which comprises image transmission apparatus 100, and a plurality of image reception apparatus 200-1 to 200-n connected to image transmission apparatus 100 via network 300. Image transmission apparatus 100 transmits image data. Image reception apparatus 200-1 to 200-n each receive image data transmitted from image transmission apparatus 100 via network 300. Image processing unit 11, video memory 12, storage unit 13, and control unit 15 have the same configuration and perform the same processing as those shown in FIG. 1. Likewise, each of image reception apparatus 200-1 to 200-n has the same configuration and performs the same processing as image reception apparatus 200 illustrated in FIG. 1. Also, image reception apparatus 200-1 to 200-n may be a plurality of projectors or a combination of computers and displays.

Image transmission unit 141 shown in FIG. 11 simultaneously transmits image data to a plurality of image reception apparatus 200-1 to 200-n. In this event, differences in processing capabilities among respective image reception apparatus 200-1 to 200-n and conditions on used transmission paths may cause variations in the time that elapses until image data has been completely transmitted or may require a longer time until completion of the transmission than in the embodiment illustrated in FIG. 1. However, even with such variations in time, the next processing is not performed until image data has been completely transmitted, as descried in the embodiment illustrated in FIG. 1 in order to avoid wasteful processing, thus making it possible to reduce a wasteful load on control unit 15.

In regard to the processing in the embodiment illustrated in FIG. 1 or 11, if a portion that changes in the image has a height exceeding $\Delta L$ in image transmission apparatus 100, the load on control unit 15 is reduced because such a change in the image can be detected in a short time. Accordingly, there is good reason to expect the advantages, as mentioned above, when application software running on image transmission apparatus 100 is used for making a presentation or for displaying general images and texts.

The activation interval, described at step 401, can be adjusted in accordance with the bandwidth of a network or the amount of traffic on the network. If the network is likely to have an excessive load, the activation interval can be set longer to avoid such an excessive load on the network. This can also cause the image to be captured with a lower frequency to reduce the load on the control unit. Further, since the aforementioned image compression is performed after image capture processing, reduced frequency of image capturing necessarily leads to a corresponding reduction in the frequency of image compression. It is therefore possible to reduce or prevent a wasteful load on the control unit associated with image compression for changes in images, which are not in line with the bandwidth of the network.

In the embodiment described above, lines are removed in the horizontal direction in the image to define the portions of image used to monitor the image, but lines may be removed in the vertical direction. Further, to the extent that the image can be monitored, the image may not necessarily be monitored in units of lines in the vertical or horizontal direction.

Also, while the foregoing description has been given of an example in which the portions of image are uniformly shifted to set the portions of image for comparison at the next periodic activation, the portions of image may be randomly shifted for the setting.

Image transmission apparatus 100 may have a display screen or may not have a display screen as a dedicated server.

In the present invention, processing within image transmission apparatus 100 may be executed by storing a program for implementing its functions on a memory medium readable by image transmission apparatus 100, and by reading the program stored on the memory medium in image transmission apparatus 100, except for that implemented by the dedicated hardware as described above. The memory medium readable by image transmission apparatus 100 includes HDD or the like built in image transmission apparatus 100, other than a removable memory medium such as a floppy disk, a magneto-optical disk, DVD, CD or the like. The program stored on the memory medium is read, for example, by a control block to execute processing similar to the foregoing under control of the control block.

While a preferred embodiment of the present invention has been described in specific terms, such description is for illustrative purpose only, and it is to be understood that changes and variations may be made without departing from the spirit or scope of the following claims.

What is claimed is:

1. An image transmission apparatus, comprising:
  an image change monitoring unit for monitoring a subsequent image to determine whether the subsequent image has changed from a latest image used to generate image data to be transmitted to an image reception apparatus via a network;
  a video memory to store images including the latest image and the subsequent image; and
  an image capturing unit responsive to a determination made by said image change monitoring unit that the subsequent image has changed in order to capture from the video memory, the subsequent image after the change so that the subsequent image may be acquired,
  wherein said image change monitoring unit sets a line that is to be monitored by removing lines in a horizontal direction in the subsequent image, and sequentially shifts the line in order to monitor the subsequent image.

2. The image transmission apparatus according to claim 1, wherein said image capturing unit does not capture the subsequent image after the change while the image data is being transmitted to said image reception apparatus via the network.

3. The image transmission apparatus of claim 1, wherein, in a first sequential shifting of the line, a line of a first predetermined size is removed from between respective lines.

4. The image transmission apparatus of claim 3, wherein, in a second sequential shifting of the line, a line of a second predetermined size being half the first predetermined size of the first predetermined line is removed from between respective lines.

5. The image transmission apparatus of claim 4, wherein, in the second sequential shifting of the line, portions of the image to be monitored are shifted down by the second predetermined size.

6. The image transmission apparatus of claim 4, wherein, in a subsequent shifting after the second sequential shifting of the line, a line of a third predetermined size being one fourth of the first predetermined size is removed from between respective lines.

7. The image transmission apparatus of claim 6, wherein, in subsequent shifting after the second sequential shifting of the line, portions of the image to be monitored are shifted down by the third predetermined size.

8. The image transmission apparatus according to claim 1, wherein the change in the image is detected in one dimension.

9. The image transmission apparatus according to claim 1, wherein the change in the image is detected in a single dimension.

10. A method in an image transmission system having an image transmission apparatus for transmitting image data generated from an image on a screen, and an image reception apparatus configured for connection with said image transmission apparatus via a network, said method comprising:
monitoring a subsequent image to determine whether the subsequent image has changed in said image transmission apparatus from a latest image used to generate image data to be transmitted to the image reception apparatus via the network;
capturing the subsequent image from a video memory after the change to acquire the subsequent image when determining that the subsequent image has changed;
transmitting image data generated from the acquired image from said image transmission apparatus to said image reception apparatus via the network; and
setting a line that is to be monitored by removing lines in a horizontal direction in the subsequent image, and sequentially shifting the line to monitor the subsequent image.

11. The method according to claim 10, further comprising avoiding the capturing of the subsequent image after the change while the subsequent image data is being transmitted to said image reception apparatus via the network.

12. The method according to claim 10, wherein the change in the image is detected in one dimension.

13. The method according to claim 10, wherein the change in the image is detected in a single dimension.

14. A tangible memory medium that stores a computer program for causing a computer to execute a method, said method comprising:
a procedure for monitoring a subsequent image to determine whether or not the subsequent image has changed from a latest image used to generate image data to be transmitted to an image reception apparatus via a network;
a procedure for capturing the subsequent image from a video memory after the change to acquire the subsequent image when determining that the subsequent image has changed;
a procedure for transmitting image data from an image transmission apparatus for transmitting the subsequent image data, that is generated from the acquired image, via a network to an image reception apparatus configured for connection with said image transmission apparatus via the network; and
a procedure for setting a line that is to be monitored by removing lines in a horizontal direction in the subsequent image, and sequentially shifting the line to monitor the subsequent image.

15. The tangible memory medium according to claim 14, wherein the change in the image is detected in one dimension.

16. The tangible memory medium according to claim 14, wherein the change in the image is detected in a single dimension.

17. An image transmission apparatus, comprising:
image change monitoring means for monitoring a subsequent image to determine whether or not the subsequent image has changed from a latest image used to generate image data to be transmitted to an image reception apparatus via a network; and
a video memory to store images including the latest image and the subsequent image;
image capturing means responsive to a determination made by said image change monitoring means that the subsequent image has changed in order to capture the subsequent image from the video memory after the change so that the subsequent image may be acquired,
wherein said image change monitoring means sets a line that is to be monitored by removing lines in a horizontal direction in the subsequent image, and sequentially shifts the line in order to monitor the image, and
wherein said image capturing means does not capture the subsequent image after the change while the image data is being transmitted to said image reception apparatus via the network.

18. The image transmission apparatus according to claim 17, wherein the change in the image is detected in one dimension.

19. The image transmission apparatus according to claim 17, wherein the change in the image is detected in a single dimension.

* * * * *